United States Patent [19]

Johnston

[11] Patent Number: 5,419,366
[45] Date of Patent: May 30, 1995

[54] VALVE

[76] Inventor: Ian F. Johnston, 106 Nicolson St., Brooklyn, Pretoria, South Africa

[21] Appl. No.: 98,578

[22] Filed: Jul. 28, 1993

[30] Foreign Application Priority Data

Jul. 28, 1993 [ZA] South Africa .................. 92/5659

[51] Int. Cl.⁶ .............................................. F16K 17/19
[52] U.S. Cl. .............................. 137/493.7; 137/493.8; 137/526; 137/854
[58] Field of Search ................. 137/493.7, 493.8, 854, 137/493.9, 526

[56] References Cited

U.S. PATENT DOCUMENTS

| | | |
|---|---|---|
| 4,181,146 | 1/1980 | Goglio .................................. 137/854 |
| 4,379,470 | 4/1983 | Reutter . |
| 4,502,502 | 3/1985 | Krug .................................. 137/854 X |
| 4,513,784 | 4/1985 | Farrand .................................. 137/854 |
| 4,962,548 | 10/1990 | van Deventer et al. . |
| 5,067,449 | 11/1991 | Bonde .................................. 137/854 X |
| 5,129,426 | 7/1992 | Boehmer .................................. 137/854 |

FOREIGN PATENT DOCUMENTS

| | | |
|---|---|---|
| 905617 | 6/1992 | South Africa . |
| 901978 | 7/1962 | United Kingdom . |
| 1302631 | 1/1973 | United Kingdom . |
| 2088023 | 6/1982 | United Kingdom . |

Primary Examiner—Robert G. Nilson
Attorney, Agent, or Firm—Christie, Parker & Hale

[57] ABSTRACT

A valve assembly for automatic venting of excess suction or pressure in a fluid conduit such as a sewage drain line. An elastomeric diaphragm is drawn by a stressed stem against a valve plate having a passageway therethrough which is normally closed by the diaphragm. A predetermined differential pressure across the diaphragm will lift the diaphragm away from the plate to open the passageway.

6 Claims, 4 Drawing Sheets

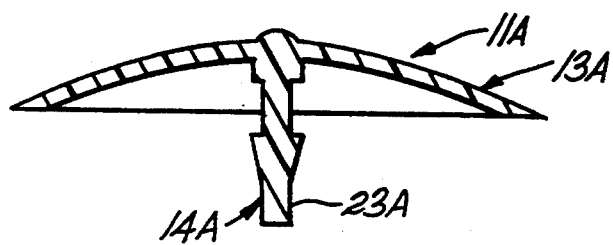
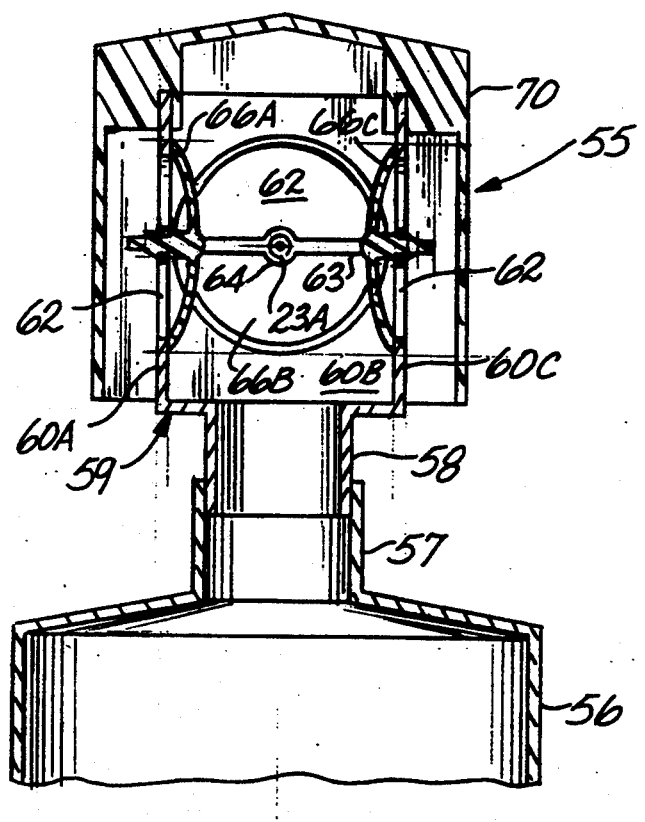

VALVE

CROSS REFERENCE TO RELATED APPLICATION

This application is based on and claims the filing date of Republic of South Africa Patent Application 92/5659 filed on Jul. 28, 1992.

BACKGROUND OF THE INVENTION

This invention relates to a valve, and more particularly to one-way and two-way valves which are particularly suited to low-pressure applications.

One-way poppet valves which function to admit a fluid into a system or allow a fluid to egress from a system are well known. These valves usually have a valve element consisting of a circular head mounted on an elongated shaft extending normally from the head and through a valve guide. The valve head seals against a cylindrical valve seat. The valve element is urged into a closed position wherein the head seals against the seat by a compression spring, and is opened by lifting the valve head from the seat by some form of mechanical action, or by a pressure differential across the valve.

Two-way valves which function to admit air or fluid into a system in response to negative pressure within the system and to release air or fluid from the system in response to positive pressure, are also common. Examples of such valves are disclosed in U.S. Pat. No. 507,636 which describes a two-way valve for use on beer tanks, U.S. Pat. No. 2,351,874 showing a two-way valve for use with fuel tanks, South African Patent 90/5617 on two-way float valves, and South African Patents 87/6659 and 89/8855 corresponding to U.S. Pat. No. 4,962,548 on a two-way valve for use with sanitary plumbing systems.

All of these two-way valves have a valve housing, a cross-plate within the housing, at least two apertures through the cross-plate and at least two one-way valve means arranged to seal the apertures, but operable to permit a bi-directional flow of fluid. These valves all utilize a closure member or diaphragm which is urged into a closed position by a compression spring.

The above described valves have a disadvantage because the valve mechanism is relatively complex involving many parts. This adds to the costs of each valve, as the parts must be fabricated and assembled to form the valve assembly. In addition, the diaphragm is slidable on a spindle which can wear. This can result in the diaphragm sticking in either an open position or a closed position.

SUMMARY OF THE INVENTION

In accordance with this invention, there is provided a valve comprising a valve plate having at least one fluid passageway therethrough, and a closure member in the form of a domed elastomeric diaphragm securable to the valve plate with the concavity of the dome facing the valve plate and movable from a closed position to an open position in response to a predetermined fluid pressure differential across the diaphragm and from the open to the closed position under biasing from the elastomeric material of the diaphragm.

There is also provided for the plate to have a plurality of fluid passageways therethrough, each passageway being occludable be a domed elastomeric diaphragm, and for the diaphragms to be disposed on the same surface of the plate to permit fluid flow through the passageways in one direction only, alternatively there is provided for the diaphragms to be disposed on opposite surfaces of the plate to permit fluid to flow through the passageways in two directions.

In one form, the valve plate is annular, and has a single fluid passageway therethrough and a single domed elastomeric diaphragm secured thereto, the plate being insertable in a complimentarily shaped recess in a secondary plate, alternatively in a manifold, to permit fluid to flow through the fluid passageway and consequently through the secondary plate or manifold.

Further features of the invention provide for the valve to be insertable into standard commercially available plumbing components; for the valve plate to be manufactured, preferably molded from a rigid plastic material; for the diaphragm to be manufactured, preferably by molding, from a synthetic plastic material such as polyurethane, from a synthetic rubber material such as those available under the trade names SANTOPRENE, NEOPRENE or MONOPRENE, from a natural rubber such as nitrile or latex, or from a silicon polymer.

The diaphragm is preferably circular in plan view, and has a valve stem projecting from its inner concave surface and normal to the periphery thereof, the valve stem being insertable through an aperture in a crossplate extending diametrically across the fluid passageway to secure the diaphragm to the plate, the valve stem having a retaining formation at its end to facilitate such securement.

There is also provided for the valve stem to have a spacer between the inner surface of the diaphragm and the plate; for the spacer to be an integral part of the stem and in the form of a radially outwardly extending thickening of the stem; and for the spacer to be spaced apart from the stem retaining formation by a length of reduced diameter.

There is further provided for the diaphragm and valve stem to be manufactured separately from each other and assembled by inserting an end of the stem through an aperture in the apex of the diaphragm, the end so inserted having a retaining formation to facilitate securement of the stem to the diaphragm, the retaining formation being separated from the spacer by a length of reduced diameter.

The invention provides also for a valve assembly fittable to a fluid conduit system said valve assembly comprising a housing having at least one aperture extending through a side wall thereof and a valve as described above fitted in the aperture, preferable inclined at an angle to the vertical and further preferably at an angle of 90 degrees to the vertical, to regulate fluid flow into and out of the housing.

The invention also extends to a fluid conduit system, preferably a sanitary plumbing system, having at least one valve or valve assembly as described above incorporated therein and allowing air to egress and ingress the system, alternatively to allow air to egress the system only, further alternatively to allow air to ingress the system only.

BRIEF DESCRIPTION OF THE DRAWINGS

FIG. 4 is a sectional elevation of an alternative embodiment of a valve closure member in which a diaphragm and stem are integrally formed;

Figure 5:
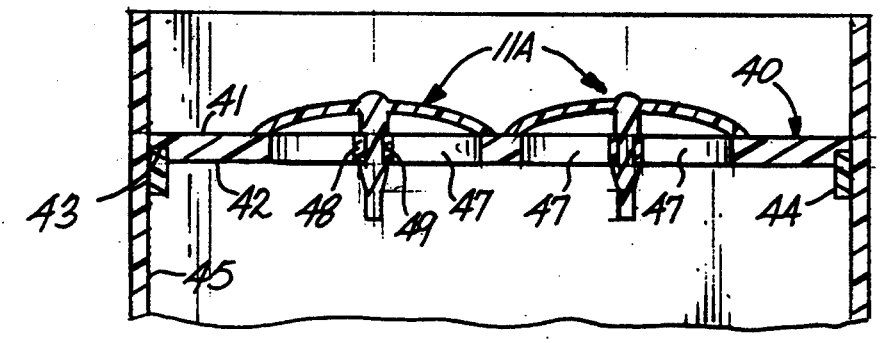
FIG. 5 is a sectional side elevation of a dual-valve assembly arranged to vent positive pressure from below.
Figure 7:
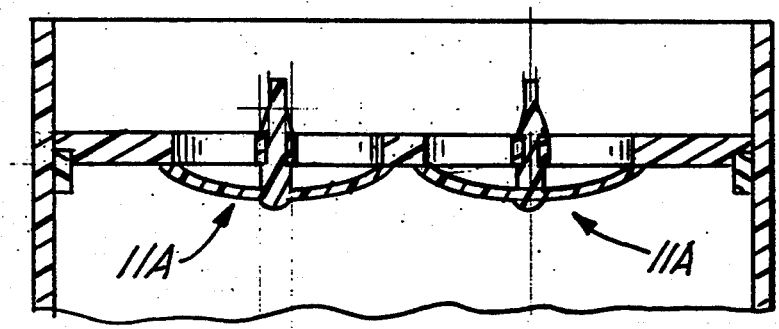
Figure 9:
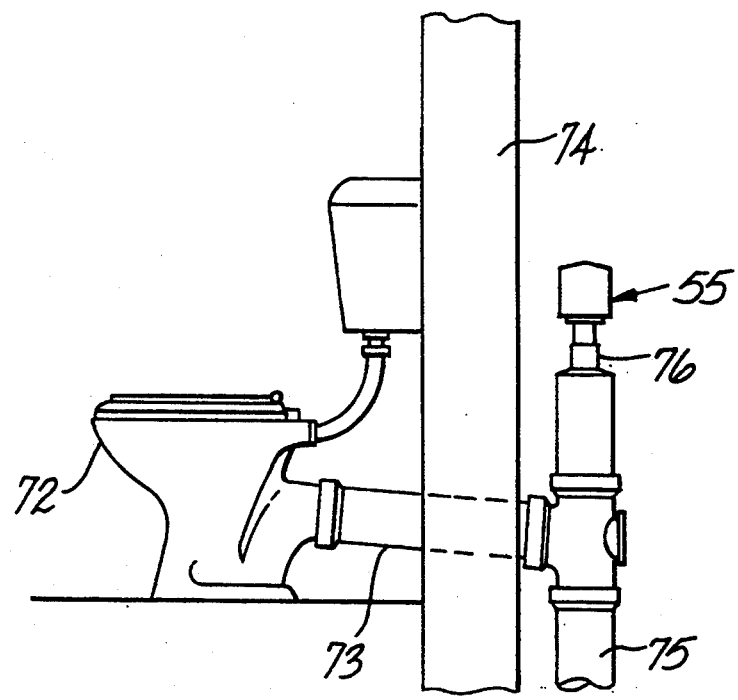

JIG. 6 is a view similar to FIG. 5, but showing valves arranged for bidirectional venting;

FIG. 7 is another view similar to FIG. 5, but with inverted dual valves to vent positive pressure from above;

FIG. 8 is a sectional side elevation of another embodiment of a valve assembly using horizontally positioned valve stems; and FIG. 9 is a side view of a typical installation of the valve assembly of this invention as installed to vent a sewage line.

DESCRIPTION OF THE PREFERRED EMBODIMENTS

Figure 1:
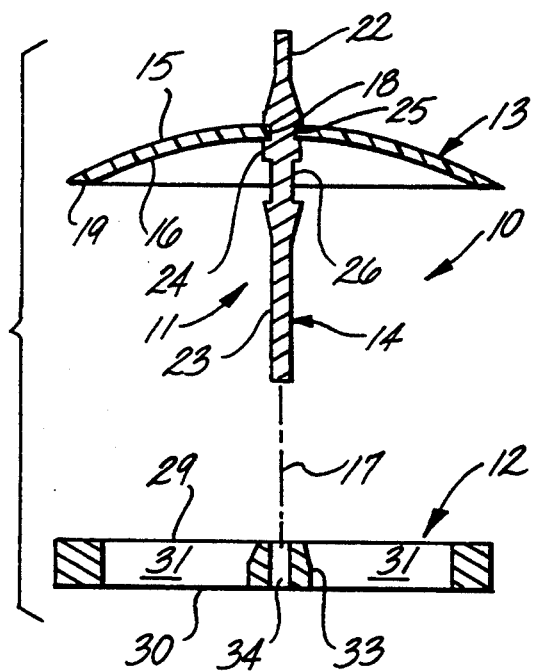
FIG. 1 is an exploded sectional elevation of a valve assembly according to the invention, and showing a closure member and a valve plate.

A valve assembly 10 is shown in exploded view in FIG. 1, and comprises a closure member 11, and a valve plate 12. The closure member has a domed circular and elastomeric diaphragm 13, and an elastomeric stem 14 secured to the diaphragm.

Diaphragm 13 has a convex upper surface 15, and a concave lower surface 16, and is circularly symmetrical about a central axis 17 with an outside diameter of about 46 mm. A circular hole 18 is formed centrally through the diaphragm on axis 17. An outer peripheral closure surface 19 of lower surface 16 is flattened and slightly inwardly and upwardly sloped so the closure surface will flatten to seal against the valve plate when the valve is closed. Closure surface 19 extends radially about 3 mm.

Valve stem 14 is elongated (typically about 37 mm in axial length) and circular in cross section, with an upper portion 22 and a lower portion 23. The stem tapers outwardly away from the upper and lower portions to define a central section 24 of enlarged diameter. A first annular recess 25 is formed in the central section adjacent the stem upper portion, and has an axial length corresponding to the cross-sectional thickness of diaphragm 13. A second annular recess 26 of about 3 mm diameter is formed in the central section adjacent the stem lower portion, and has a somewhat longer axial length (as compared to recess 25) to accommodate a valve-plate cross-member as described below.

Diaphragm 13 and stem 14 are assembled to form closure member 11 by first inserting stem upper portion 22 through diaphragm hole 18 from the diaphragm underside or lower surface. The stem upper portion is then pulled upwardly, resiliently compressing the stem central section until the diaphragm snaps into first recess 25 to lock the stem and diaphragm in sealed engagement.

Figure 2:
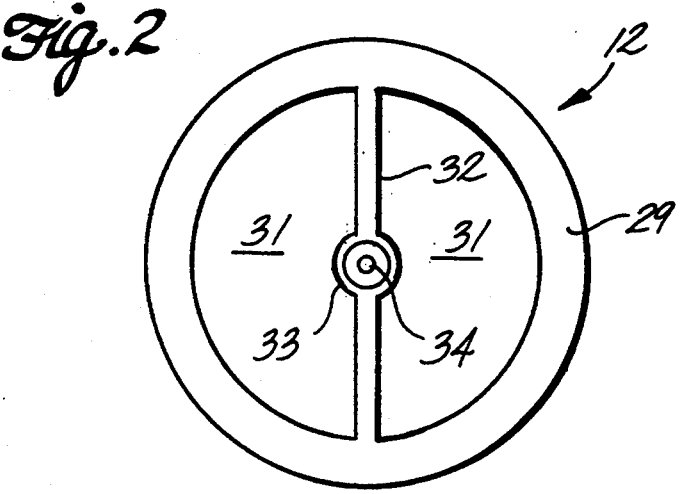
FIG. 2 is a top view of the valve plate of FIG. 1.

Valve plate 12 is preferably molded from a rigid plastic material (PVC or ABS is satisfactory), and is circular in shape (FIG. 2), with upper and lower parallel flat surfaces 29 and 30. A central circular opening or fluid passageway 31 is formed through the plate, and has a diameter of about 41 mm. A crossmember 32 extends across passageway 31, and is integrally formed at its ends with the inner surface of the annular rim of the valve plate.

A central portion of the crossmember is enlarged to define a boss 33 having a central bore or hole 34 (of 3 mm diameter to match recess 26) extending therethrough on the central circular axis of the plate. The thickness of plate 12 corresponds to the axial length of second annular recess 26 of the valve stem.

The valve assembly is completed by inserting stem lower portion 23 downwardly (as seen in FIG. 1) though crossmember hole 34, and then continuing to pull the stem downwardly until boss 34 snaps into second annular recess 26 to place the stem and valve plate in locked and sealed engagement.

Figure 3:
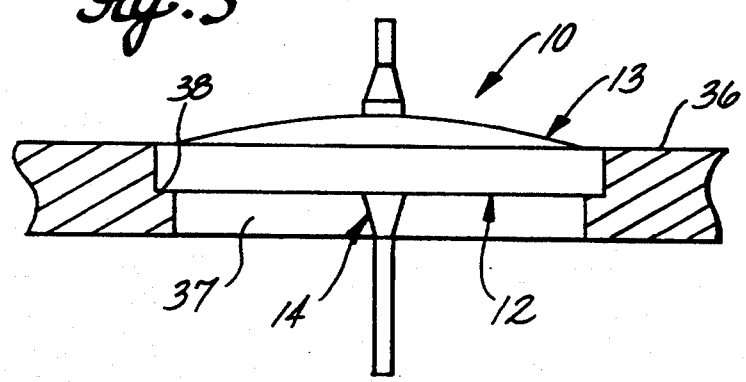
FIG. 3 is a side elevation, partly in section, of the valve assembly as mounted on a wall.

A typical installation of valve assembly 10 in a wall 36 is shown in FIG. 3. Wall 36 separates two zones in which different fluid pressures may exist, and the wall has a circular opening 37 therethrough which is recessed to form a seat 38 for valve plate 12. The valve plate may be press fitted in the wall, or may be cemented or clamped in place so the valve plate and wall are in sealed engagement. Closure surface 19 of diaphragm 13 will lift away from the valve plate to open the valve when fluid pressure beneath the wall exceeds fluid pressure above the valve by a predetermined amount.

In an alternative embodiment shown in FIG. 4, a closure member 11A is generally similar to member 11, but is integrally molded so diaphragm 13A and stem 14A are formed as a single unit. This construction eliminates the protruding upper portion of the stem, and enables shortening of a stem lower portion 23A because the stem can be pushed, rather than pulled into engagement with the valve plate. The two-piece construction of member 11 provides more compact shipment and storage, whereas the integrally molded member 11A eliminates an assembly step.

Figure 6:
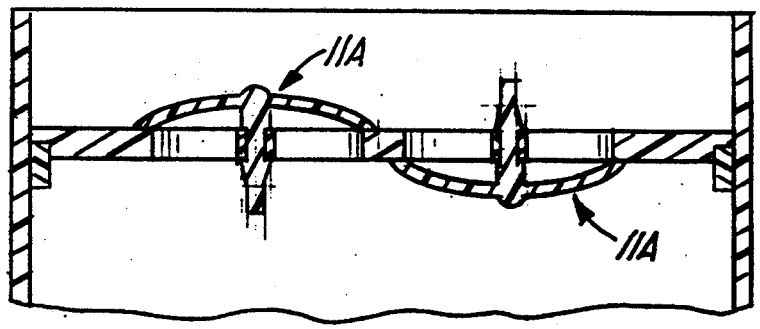

A single multiple-aperture valve plate is also useful in the practice of the invention as illustrated in several different embodiments in FIGS. 5–7. Common to these embodiments is circular-in-planform valve plate 40 with flat and parallel upper and lower surfaces 41 and 42. The perimeter of the plate has a recess 43 which is cemented to, or makes a sealed press fit against a retaining ring 44 secured to the inner wall of a pipe 45 which is typically a plumbing vent line of 110-mm diameter, and with an upper end which is open to the outside atmosphere.

Plate 40 has two circular fluid passageways 47 extending therethrough, each of which is spanned by a crossmember 48 with a central hole 49 just as described above in connection with valve plate 12 and crossmember 32. A pair of closure members 11A as already described are mounted on plate 40 to close passageways 47.

In the configuration of FIG. 5, the convex side of the valve diaphragms face the vented upper end of pipe 45, and the valves will open responsive to differential pressure across the diaphragms when pressure below the valves exceeds atmospheric pressure by a predetermined amount. In FIG. 6, the two valve assemblies are oppositely oriented to provide bidirectional valving action responsive to a pressure differential in either direction. The configuration of FIG. 7 is the opposite of that shown in FIG. 5, and both valves open responsive to suction, i.e., when pressure within the pipe is less than atmospheric pressure by a predetermined amount.

Preferably, a vented cap or cowl (not shown, but of the style illustrated in FIG. 8) is fitted over the upper open end of pipe 45 to prevent entry of dirt, leaves and water. The use of multiple valves is useful in applications requiring substantial flow rates when the valves are open, or to provide bidirectional pressure relief.

An important feature of the valve of this invention is that closure force is provided by the restoring force of the stressed elastomeric diaphragm and stem, rather than by gravity (as in a flotation-type valve) or a separate closure spring. The need for valve guides to maintain proper alignment is also eliminated. This feature makes the valve insensitive to mounting position, and reliable operation is provided for either vertical or horizontal (or any intermediate angulation) orientation of the valve-stem axis. This mounting flexibility is a significant improvement over conventional pressure-relief or "suction breaker" valves which typically must be positioned to orient the stem vertically, or no more than about 15 degrees off vertical.

A pressure-relief assembly 55 using horizontally oriented valves (i.e., with a generally horizontal orientation of each valve-stem axis, and vertical orientation of the diaphragm and closure surfaces) is shown in FIG. 8, and is designed to relieve either excess pressure or suction in a cylindrical vertical pipe 56 of a waste drainage system. Pipe 56 is necked down at its upper end to a cylindrical stub 57 which receives and is sealed to a mating cylindrical stub 58 at the bottom of a housing 59 of assembly 55.

Housing 59 is an integrally molded and square-in-planform (when viewed from above in FIG. 8) box having flat sidewalls 60A, 60B, and 60C. A fourth sidewall is omitted in the sectional view of FIG. 8. Each of sidewalls 60A–C has a circular aperture forming a fluid passageway 62, and a crossmember 63 with a boss 64 (just as in valve plate 12) spans the diameter of each passageway.

Closure members 66A and 66C (corresponding to closure member 11A) are mounted over the inner surfaces of opposite walls 60A and 60C to admit outside air if suction develops in pipe 56. The stems of the closure members are horizontally oriented, and are engaged through openings in bosses 64 as already described.

A third closure member 66B is mounted over the outer surface of wall 60B, and will open to relieve any excess pressure (above atmospheric) which may develop in pipe 56. In most installations, one pressure-relief (as opposed to suction-relief) valve will provide adequate flow rates, but another pressure-relief may be added in the fourth wall of the housing if necessary.

A cowl or vent cap 70 is fitted over the top of housing 59 to prevent entry of water, dirt or debris into the housing. A typical installation of assembly 55 is illustrated in FIG. 9 showing a toilet 72 connected to a sloping drain line 73 which extends through a dwelling exterior wall 74 to a vertical sewage pipe 75 which has an open upper end 76. Assembly 55 is secured in upper end 76 to vent either positive or negative pressure within the system.

The valve assembly of this invention is designed to open at low differential pressure which are typically in the range of 0.015 to 0.02 pounds per square inch. Good flow rates (in the range of 200 liters per minute) are achieved in the open position, and closure is automatic without use of auxiliary springs or guides when the pressure differential is relieved. The invention finds particular utility in the venting of waste lines and traps as used in water drainage systems.

The diaphragm and stem of the closure member are molded from an elastomer which is preferably a natural rubber, or a synthetic material such as polyurethane or materials as marketed under the trademarks Santoprene, Neoprene and Monoprene. The latter polymer (available from QST Inc., in St. Albans, Vt.), for example, is available in several durometer hardnesses (types MP 1479 and MP 2955E are suitable) which is a factor in establishing the differential pressure which will cause the valve to open. Other parameters, including the diameter and thickness of the diaphragm, and the cross section of the valve stem, may also be varied to establish the opening differential pressure.

What is claimed is:

1. A valve assembly for use with a vertical plumbing fluid conduit, and operative to vent the conduit responsive to a predetermined differential pressure between the interior of the conduit and outside atmosphere, comprising:

a housing adapted for connection to an upper end of the conduit, the housing having a first flat vertical wall defining a valve plate with a fluid passageway therethrough;

an elastomeric closure member with a resilient domed diaphragm, and an elongated resilient stem extending from the diaphragm and secured to the plate, the diaphragm having a convex side facing away from the plate, and a concave side facing the plate and having a perimeter in contact with the plate to close the passageway, the stem being stressed to urge the diaphragm perimeter against the plate, the diaphragm being resiliently flexed away from the plate to open the passageway when fluid pressure against the concave side exceeds fluid pressure against the convex side by a predetermined amount; and a cap fitted over the housing, the cap having a sidewall spaced from and extending downwardly over an outer surface of the housing to an open lower end to define a vent path from the valve plate downwardly to the open lower end.

2. The assembly defined in claim 1 wherein the housing has a second flat vertical wall spaced from the first wall, the second wall defining a valve plate with a second fluid passageway therethrough, the assembly further comprising a second elastomeric closure member as defined in claim 1 mounted on and secured to the second wall over the second passageway.

3. The assembly defined in claim 2 in which the elongated stems of the closure members extend generally horizontally.

4. The assembly defined in claim 3 wherein the closure members are oppositely oriented so one member opens to admit fluid into the conduit, and the other member opens to release fluid from the conduit.

5. The assembly defined in claim 4 is which each valve plate has a single cross-member strut extending across the associated passageway, the strut having an enlarged central boss with a bore therethrough, the resilient stem of the associated closure member being seated in the bore.

6. The assembly defined in claim 5, wherein the housing is square in cross section to define four flat vertical walls.

* * * * *